United States Patent
Cuddihy et al.

(10) Patent No.: US 9,630,496 B2
(45) Date of Patent: Apr. 25, 2017

(54) REAR OCCUPANT WARNING SYSTEM (71) Applicant: Ford Global Technologies, LLC, Dearborn, MI (US)

(72) Inventors: Mark A. Cuddihy, New Boston, MI (US); Manoharprasad K. Rao, Novi, MI (US); Kwaku O. Prakah-Asante, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/666,832

(22) Filed: Mar. 24, 2015

(65) Prior Publication Data

US 2016/0280067 A1    Sep. 29, 2016

(51) Int. Cl.
*B60B 23/02* (2006.01)
*B60K 28/04* (2006.01)
*B60N 2/00* (2006.01)
*G08B 21/02* (2006.01)

(52) U.S. Cl.
CPC ............... *B60K 28/04* (2013.01); *B60N 2/00* (2013.01); *G08B 21/02* (2013.01)

(58) Field of Classification Search
CPC ...... B60N 2/002; B60K 28/04; B60R 21/0153
USPC ................................................. 340/457, 438
See application file for complete search history.

(56) References Cited

U.S. PATENT DOCUMENTS

| | | | |
|---|---|---|---|
| 5,949,340 A | 9/1999 | Rossi | |
| 6,861,970 B1 | 3/2005 | Garland | |
| 6,922,147 B1 | 7/2005 | Viksnins et al. | |
| 7,714,737 B1 | 5/2010 | Morningstar | |
| 8,058,983 B1 | 11/2011 | Davisson et al. | |
| 8,063,788 B1 | 11/2011 | Morningstar | |
| 8,816,845 B2 | 8/2014 | Hoover et al. | |
| 2002/0059022 A1* | 5/2002 | Breed | G06K 9/00362 701/45 |
| 2003/0105570 A1* | 6/2003 | Basir | B60R 21/01516 701/45 |
| 2003/0222775 A1 | 12/2003 | Rackham et al. | |
| 2006/0044127 A1 | 3/2006 | Ho et al. | |
| 2006/0251293 A1* | 11/2006 | Piirainen | B60N 2/002 382/104 |
| 2006/0273917 A1* | 12/2006 | Rams | B60N 2/002 340/667 |

(Continued)

FOREIGN PATENT DOCUMENTS

| | | |
|---|---|---|
| CN | 102259629 A | 11/2011 |
| GB | 2391746 A | 11/2004 |

OTHER PUBLICATIONS

Search Report from corresponding GB Application No. 1604959.5, dated Aug. 24, 2016.

(Continued)

*Primary Examiner* — Ojiako Nwugo
(74) *Attorney, Agent, or Firm* — Frank MacKenzie; Brooks Kushman P.C.

(57) ABSTRACT

A vehicle occupant alert system may include an in-vehicle sensor configured to detect an object in a rear seat of a vehicle, and a controller configured to receive, from the sensor, an indication of an object in the rear seat, and to transmit, in response to the indication, presence information to a mobile device to cause the mobile device to transmit a command to a wearable device including instructions for an alert at the wearable device.

14 Claims, 5 Drawing Sheets

(56) References Cited

U.S. PATENT DOCUMENTS

| | | | |
|---|---|---|---|
| 2011/0010037 A1* | 1/2011 | Inayoshi | B60N 2/002 |
| | | | 701/31.4 |
| 2011/0038504 A1* | 2/2011 | Liu | F16F 15/03 |
| | | | 381/392 |
| 2011/0267186 A1 | 11/2011 | Rao et al. | |
| 2012/0050021 A1 | 3/2012 | Rao et al. | |
| 2012/0154136 A1 | 6/2012 | Connelly, Jr. | |
| 2012/0218091 A1 | 8/2012 | Rothschild | |
| 2014/0269414 A1* | 9/2014 | Hyde | H04L 41/0803 |
| | | | 370/254 |
| 2015/0130604 A1* | 5/2015 | Gomez Collazo | B60N 2/002 |
| | | | 340/457 |
| 2015/0165932 A1* | 6/2015 | Maley | B60N 2/002 |
| | | | 340/457 |
| 2015/0382160 A1* | 12/2015 | Slay, Jr. | H04W 4/12 |
| | | | 455/466 |
| 2016/0031342 A1* | 2/2016 | Camello | B60N 2/002 |
| | | | 701/45 |
| 2016/0042616 A1* | 2/2016 | Dorsey | G08B 21/24 |
| | | | 340/457 |
| 2016/0082923 A1* | 3/2016 | Gavriel | B60R 22/48 |
| | | | 340/438 |

OTHER PUBLICATIONS

Search Report from corresponding GB Application No. 1604959.5, dated Nov. 22, 2016.

* cited by examiner

REAR OCCUPANT WARNING SYSTEM

TECHNICAL FIELD

Disclosed herein is a vehicle rear occupant warning system.

BACKGROUND

Vehicles are often equipped with various mechanisms for detecting the presence of occupants within the vehicle. These mechanisms are often used to issue alerts to a driver in the event that an object, person, pet, etc., has been left in the vehicle. However, many of these alerts may not efficiently or discreetly alert a user that something or someone remains in the vehicle.

SUMMARY

A vehicle occupant alert system may include an in-vehicle sensing mechanism configured to detect an object in a rear seat of a vehicle, a controller configured to receive, from the sensing mechanism, an indication of an object in the rear seat, and to transmit, in response to the indication, presence information to a mobile device to cause the device to transmit a command to a wearable device including instructions for an alert at the wearable device.

A vehicle occupant alert system may include a mobile device having a processor configured to receive, from a vehicle, presence data indicative of an object in a rear seat of a vehicle; and transmit, in response to the data, a command to a wearable device including instructions for a haptic alert at the wearable device.

A system may include a controller configured to receive, from a door sensor, an indication of a closing of a driver door, to receive, from a seat sensor, an indication of an object in a rear seat, and to transmit, in response to the object indication and in response to a rear door not opening within a predefined amount of time from the driver door closing, presence information to a mobile device.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A system may be configured to transmit warnings to a user via a user's wearable device indicating that an object, animal, or person has been left in a vehicle after key-off. By using a wearable device as a mechanism for issuing alerts, the alerts may be realized in a haptic or non-audio form. The haptic warning may be discrete and not detectable by others in near proximity to the wearer. At the same time, it is difficult for the wearer to ignore the tiny vibrations on their body.

Figure 1A:
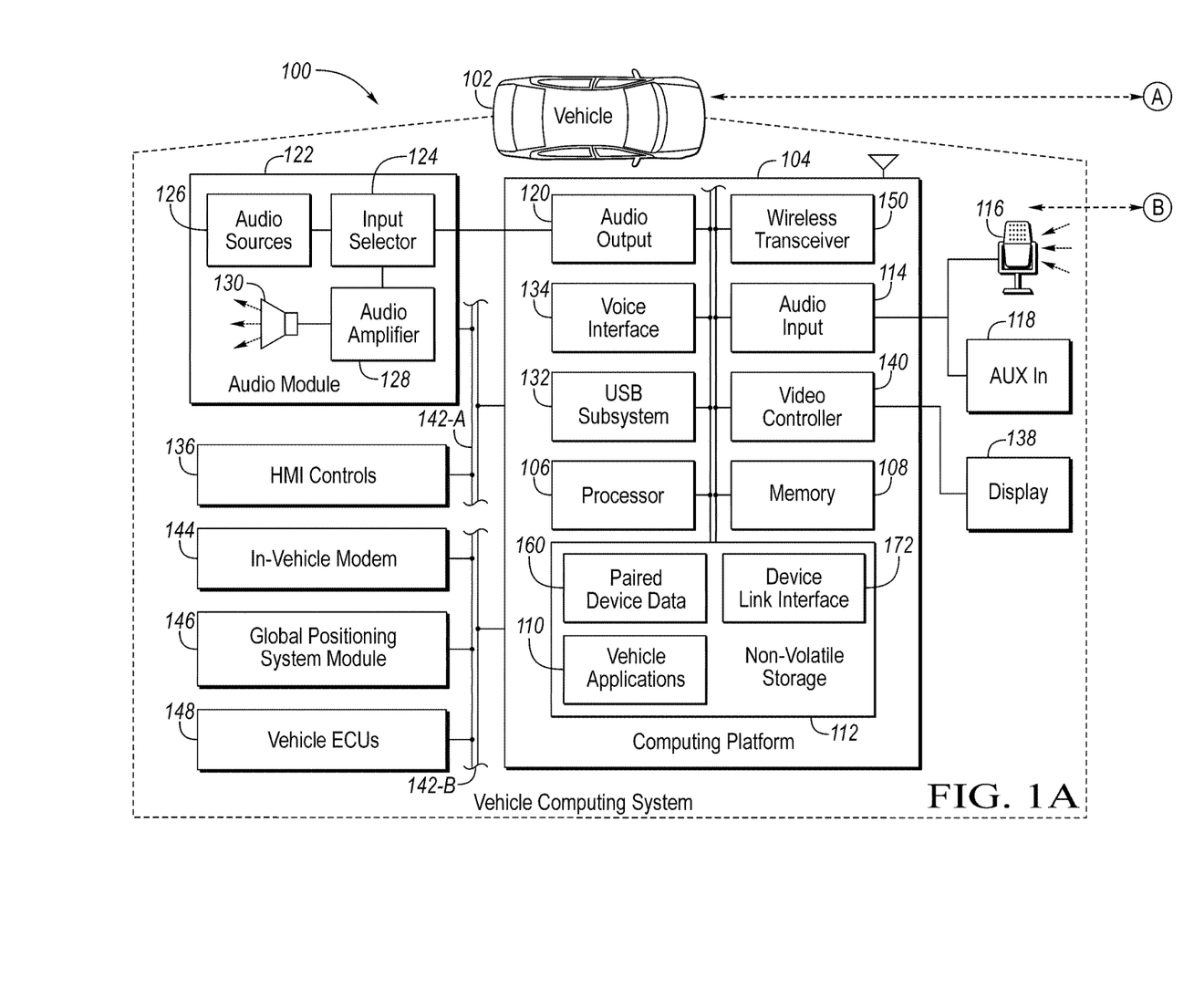
FIGS. 1A and 1B illustrate an example diagram of a system that may be used to provide telematics services to a vehicle.
Figure 1B:
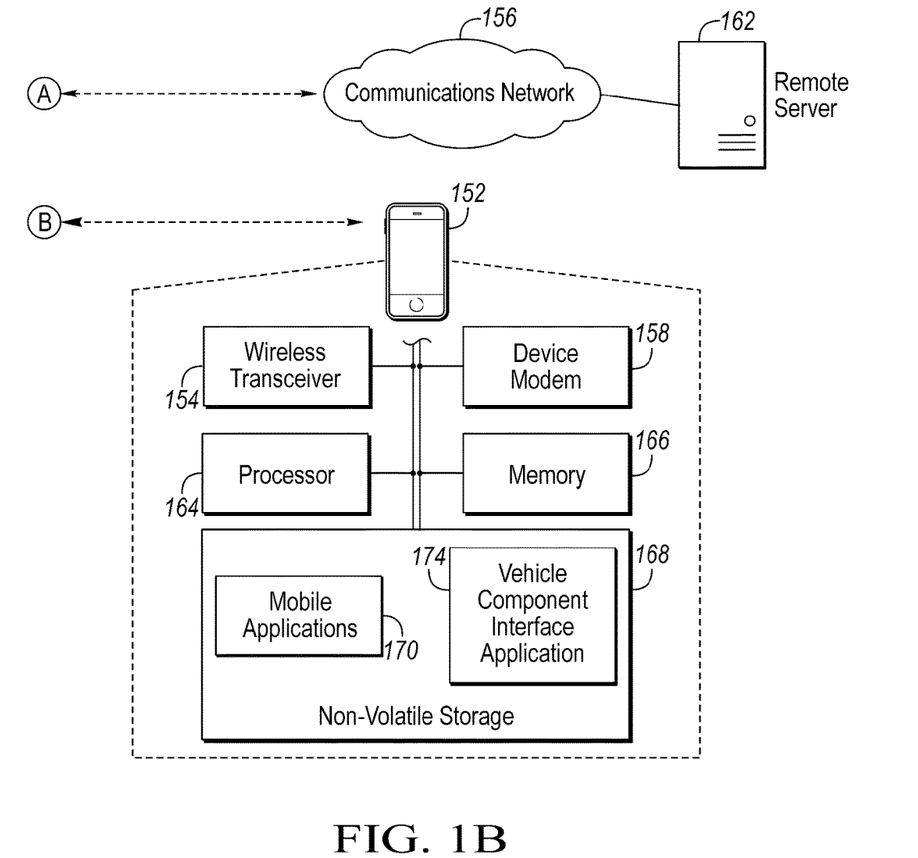

FIGS. 1A and 1B illustrate an example diagram of a system 100 that may be used to provide telematics services to a vehicle 102. The vehicle 102 may be one of various types of passenger vehicles, such as a crossover utility vehicle (CUV), a sport utility vehicle (SUV), a truck, a recreational vehicle (RV), a boat, a plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to grammar associated with available commands, and voice prompt generation for output via the audio module 122. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to cooperate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142-A, and the vehicle modem 144, GPS module 146, and vehicle ECUs 148 may communicate with the computing platform 104 over a second in-vehicle network 142-B. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternately, the computing platform 104 may communicate with the mobile device 152 over a wired connection, such as via a USB connection between the mobile device 152 and the USB subsystem 132.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnected to the mobile devices 152 referenced in the paired device data 160 without user intervention.

When a mobile device 152 that supports network connectivity is paired with the computing platform 104, the mobile device 152 may allow the computing platform 104 to use the network connectivity of the device modem 158 to communicate over the communications network 156 with the remote telematics services 162. In one example, the computing platform 104 may utilize a data-over-voice plan or data plan of the mobile device 152 to communicate information between the computing platform 104 and the communications network 156. Additionally or alternatively, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 via the wireless transceiver 154 and with the remote telematics services 162 or other network services via the device modem 158. The computing platform 104 may also include a device link interface 172 to facilitate the integration of functionality of the mobile applications 170 into the grammar of commands available via the voice interface 134 as well as into display 138 of the computing platform 104. The device link interfaced 172 may also provide the mobile applications 170 with access to vehicle information available to the computing platform 104 via the in-vehicle networks 142. Some examples of device link interfaces 172 include the SYNC APPLINK component of the SYNC system provided by The Ford Motor Company of Dearborn, Mich., the CarPlay protocol provided by Apple Inc. of Cupertino, Calif., or the Android Auto protocol provided by Google, Inc. of Mountain View, Calif. The vehicle component interface application 174 may be once such application installed to the mobile device 152.

The vehicle component interface application 174 of the mobile device 152 may be configured to facilitate access to one or more vehicle 102 features made available for device configuration by the vehicle 102. In some cases, the available vehicle 102 features may be accessible by a single vehicle component interface application 174, in which case such the vehicle component interface application 174 may be configured to be customizable or to maintain configurations supportive of the specific vehicle 102 brand/model and option packages. In an example, the vehicle component interface application 174 may be configured to receive, from the vehicle 102, a definition of the features that are available to be controlled, display a user interface descriptive of the available features, and provide user input from the user interface to the vehicle 102 to allow the user to control the indicated features. As exampled in detail below, an appropriate mobile device 152 to display the vehicle component interface application 174 may be identified, and a definition of the user interface to display may be provided to the identified vehicle component interface application 174 for display to the user.

Figure 2:
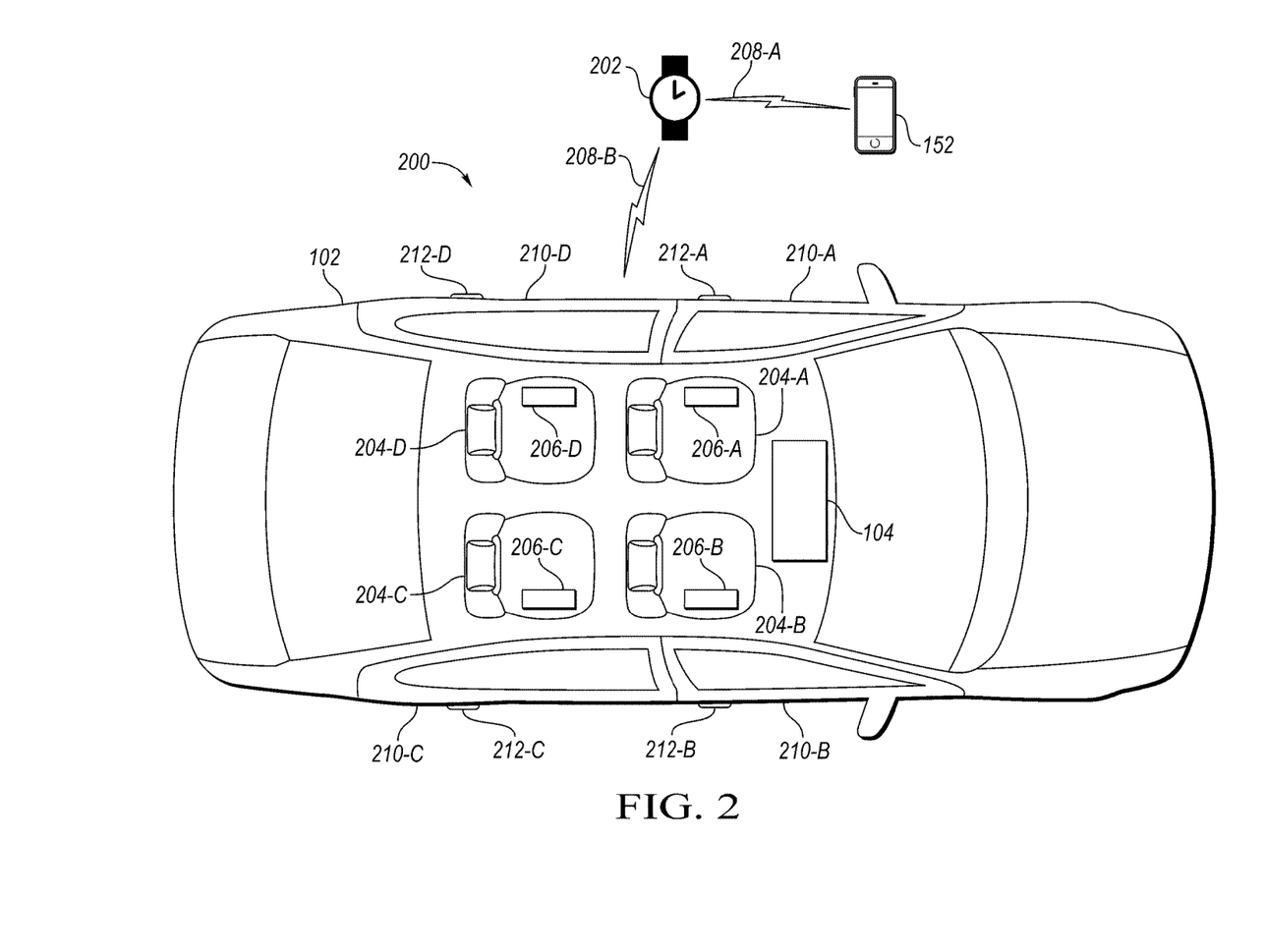
FIG. 2 illustrates an example diagram of an occupant detection system including a vehicle, a wearable device and a mobile device.

Systems such as the system 100 and system 200 may require mobile device 152 pairing with the computing platform 104 and/or other setup operations. However, as explained in detail below, a system may be configured to allow vehicle occupants to seamlessly interact with user interface elements in their vehicle or with any other framework-enabled vehicle, without requiring the mobile device 152 or wearable device 202 to have been paired with or be in communication with the computing platform 104.

FIG. 2 illustrates a rear occupant/object warning system 200 including the vehicle 102 having a plurality of vehicle seats 204A-204D (collectively 204) each having a sensing mechanism 206A-206D, respectively (collectively 206). The sensing mechanism 206 may include any mechanism capable of detecting the presence of an object, animal or person (herein after referred to as object or objects) in the respective seat 204. In one example, these sensors may be presence sensors within the seats 204 configured to receive actuation in response to an object sitting in the seat 204. In other examples, the sensors may be motion sensors, infrared sensors, ultrasonic sensors, temperature sensors, etc. Each vehicle door 210A-D (collectively 210) may include a door sensor 212A-212D (collectively 212). The door sensors 212 may be configured to detect when a door is opened and closed. The sensing mechanisms 206 and door sensors 212 may be coupled to the computing platform 104 via a wired or wireless connection and may be configured to transmit a presence signal and a door status signal to the computing platform 104 upon detecting the presence of an object within one of the seats 204.

As shown in FIG. 2, a wearable device 202 may be associated with the mobile device 152. The wearable device 202 may include a smart watch, smart glasses, fitness band, control ring, or other personal mobility or accessory device designed to be worn. Additionally or alternatively, the wearable device 202 may be integrated as part of a wearer's clothing, headwear, jewelry, etc. The wearable device 202 may be configured to communicate with the mobile device 152. For example, the wearable device 202 may communicate data with the mobile device 152 over a communication link or wireless connection 208-A (e.g., via the mobile device modem 158). Additionally or alternatively, the wearable device 202 may communicate directly with the computing platform 104 of the vehicle via a communication link or wireless connection 208-B (e.g., via the in-vehicle modem 144 or other wireless network).

The wireless connection 208-A may be a Bluetooth Low Energy (BLE) connection, but other types of local wireless connections, such as Wi-Fi or Zigbee may be utilized as well. Using the connection 208-A, the mobile device 152 may provide access to one or more control or display functions of the mobile device 152 to the wearable device 202. For example, the mobile device 152 may enable the wearable device 202 to accept a phone call to the mobile device 152, enable a mobile application the mobile device and to execute, receive and present notification sent to the mobile device 152, and/or a combination thereof.

Additionally, the mobile device 152 may provide instructions to the wearable device 202 in response to presence data received from the computing platform 104. The mobile device 152 may provide instructions indicative of certain warnings or alerts to be issued to the user via the wearable device 202. These warnings may be in the form of a haptic warning such as a vibration. By enabling a haptic warning, the wearable device 202 may alert the user as to certain situations within or around the vehicle 102, without disturbing others. In one example, the computing platform 104 may receive information from the sensing mechanism 206 indicating that an object is present in at least one of the seats 204. The computing platform 104 may then transmit such information to the mobile device 152. The mobile device 152 may in turn transmit a command to the wearable device 202 instructing the wearable device 202 to issue an alarm. This process is discussed in more detail below.

In addition to the computing platform 104 receiving rear presence information, the computing platform 104 may also receive engine and vehicle state information from the vehicle ECUs 148, such as engine control module and/or body control module. The engine state may be indicative of whether the engine is currently running, or whether the engine is off, as well as timing information indicating when the engine has been keyed-off. The computing platform 104 may use the timing information to determine the length of time that the engine has been in a certain state (e.g., an off-state). If the engine has been in an off-state and the body control module indicates that the vehicle driver door 210-A has been opened and closed and a predetermined amount of time has passed before one of the vehicle rear doors 210-C, 210-D is opened (e.g., approximately 3 minutes.), and if the sensing mechanisms 206 detect an object on the vehicle rear seats 204-C, 204-D, the computing platform 104 may send rear presence information to the mobile device 152 which in turn may instruct the wearable device 202 to issue the alarm. The vehicle computing platform 104 may also provide the vehicle user with the option of changing the above predetermined amount of time to a different value per user's individual preferences. By using the rear presence information, engine state, the timing information with respect to driver door 210-A opening and closing, and vehicle rear door 210-C, or 210-D opening alarms may only be issued when it is highly probably that the user has left the vehicle intending not to return. Thus, the user is only alerted if an object is detected within the vehicle rear seats and if the user has walked away from the vehicle after key-off. This minimizes the probability of a false-alarm, thus increasing the effectiveness of the alert.

Once the alarm has been issued via the wearable device 202, the user may return to the vehicle 102 to retrieve the object. The wearable device 202 and/or the mobile device 152 may also selectively disable the feature.

Figure 3:
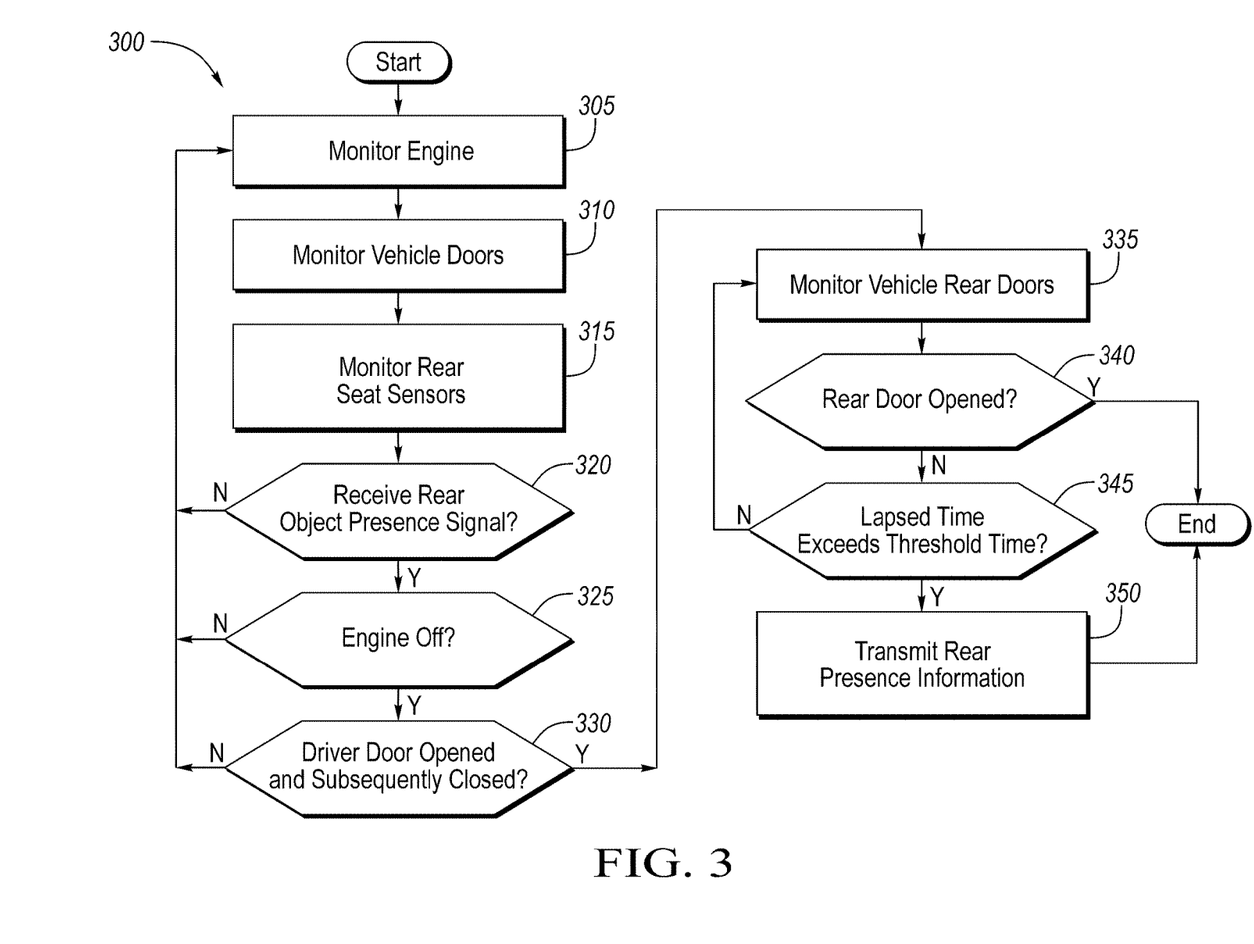
FIG. 3 illustrates an example process for the occupant detection system.

FIG. 3 illustrates a process 300 for the rear object/occupant detection system 200. Specifically, FIG. 3 illustrates a process for determining whether to send rear presence information from the computing platform 104 to the mobile device 152. While specific reference to the computing platform 104 is made with respect to FIG. 3, process 300 may be accomplished at the mobile device 152, the remote server 162 or other controllers and processors.

The process 300 begins at block 305 where the computing platform 104 monitors the engine (not shown) to determine an engine state. As explained, the engine state (e.g., on or off) may be received from other vehicle modules such as an engine control module At block 310, the computing platform 104 may monitor the driver and rear door status. The door status for each door 210 may include one of open and closed, as well as timing information regarding when a door 210 was opened or closed. The computing platform 104 may continuously monitor the door status. Alternatively, the computing platform 104 may monitor the door status in response to an engine key-off.

At block 315, the computing platform 104 may monitor the rear seats 204-C, 204-D of the vehicle via the sensing mechanisms 206-C, 206-D. Such monitoring may include determining whether a person or object is at or on the rear seats 204-C or 204-D. At block 320, the computing platform 104 determines whether a rear object presence signal has been received from at least one of the rear seat sensing mechanisms 206-C and 206_D. As explained, a presence signal may include an indication that an object is detected at or on at least one of the rear seats 204-C and 204-D. The presence signal may be transmitted from the rear seat sensing mechanisms 206-C and 206-D via wireless or wired connection. If the computing platform 104 determines that rear seat presence signal has been received, the process 300 proceeds to block 325. Otherwise, the process 300 returns to block 305 until a rear seat presence signal is received.

At block 325, the computing platform 104 may determine whether the engine of the vehicle 102 is currently off. Information as to the engine status may be monitored and received at block 305. If the computing platform 104 determines that the engine is off, the process 300 proceeds to block 330. Otherwise the process 300 proceeds to block 305.

At block 330, the computing platform 104 may determine whether the driver door 210-A has been opened and closed. This information about the driver door 210-A opening and subsequent closing may be received from the door sensor 212-A, or from the vehicle ECU 148 or other vehicle modules or applications. If the driver door 210-A is opened and subsequently closed, the process 300 proceeds to block 335. Otherwise the process 300 proceeds to block 305.

At block 335, the computing platform 104 may monitor the door status of each the rear doors 210-C, 210-D. For example, the computing platform 104 may receive door status and timing information corresponding to the same from the door sensors 212.

At block 340, the computing platform 104 may determine whether at least one of the rear doors 210-C, 210-D has been opened. Similar to block 330, the information about the rear doors 210-C, 210-D may be received from the door sensors 212-C, 212-D or from the vehicle ECU 148 or other vehicle modules or applications. If the computing platform 104 determines whether at least one of the rear doors 210-C, 210-D has been opened, the process 300 proceeds to end. Otherwise the process 300 proceeds to block 345.

At block 345, the computing platform 104 determines if a predetermined amount of time has elapsed since the driver door 210-A has been opened and closed. The computing platform 104 may determine the lapsed time using the current time and the time data included in the door state information (i.e., driver door 210-A opening and closing at block 330). The lapsed time may then be compared with a predefined time threshold. If the lapsed time exceeds the predefined time threshold, the process 300 may proceed to block 350. If the lapsed time is below the predetermined time threshold, the process 300 may return to block 335.

At block 350, the computing platform 104, in response to one of the vehicle rear doors 210-C, 210-D not being opened for a predetermined amount of time after the driver door 210-A being opened and closed, may transmit rear object presence information to the mobile device 152. This rear object presence information may indicate that an object remains in the vehicle on at least one of the rear seats 204-C and 204-D. Although not shown as part of process 300, once the mobile device 152 receives the presence information from the computing platform 104, the mobile device 152 may transmit an alarm command to the wearable device 202. Upon receiving the alarm command, the wearable device 202 may proceed to provide a haptic or otherwise non-audio alarm to the user. Once the computing platform 104 transmits the presence information to the mobile device 152, the process 300 may end.

Figure 4:
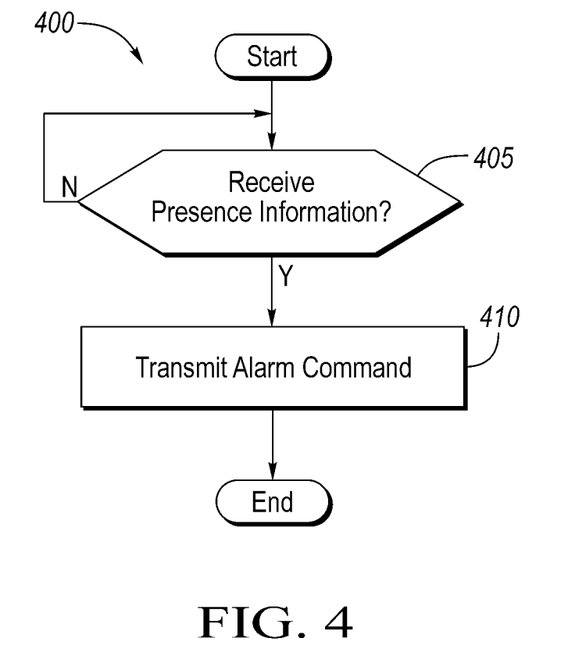
FIG. 4 illustrates another example process for the occupant detection system.

FIG. 4 illustrates another process 400 for the occupant detection system 200. Specifically, FIG. 4 illustrates a process 400 for sending alarm commands to the wearable device 202 from the mobile device 152. However, specific alarm commands may be transmitted directly to the wearable device 202 from the vehicle 102 via the wireless network 208-B. Accordingly, while specific reference to the mobile device 152 is made with respect to FIG. 4, process 400 may be accomplished at the computing platform 104, the remote server 162, or other controllers and programmers.

Process 400 begins at block 405 where the mobile device 152 may receive presence information from the computing platform 104. At block 410, the mobile device 152, in response to receiving presence information from the computing platform 104, may transmit an alarm command to the wearable device 202. The alarm command may include instructions instructing the wearable device 202 to initiate an alarm (e.g., instructing the wearable device 202 to vibrate). The process 400 may then end.

Accordingly, a wearable device may be instructed by a mobile device paired therewith to issue a haptic, non-audio alarm in response to various vehicle components indicating that an object may have been left in the vehicle rear seats. By warning a driver via a wearable device, an efficient and discrete mechanism for alerting a user remote from a vehicle of an object left in the vehicle rear seats is realized.

Computing devices, such as the mixer, remote device, external server, etc., generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle occupant alert system comprising:
   an in-vehicle sensor configured to detect an object in a vehicle rear seat; and
   a controller configured to
      receive, from the sensor, an indication of an object in the rear seat, and
      transmit, in response to the indication, presence information indicating the object in the rear seat to a mobile device to cause the device to transmit a command to a wearable device, the command including instructions for an alert at the wearable device.

2. The system of claim 1, wherein the controller is further configured to monitor, via at least one door sensor, the opening and closing of the vehicle doors.

3. The system of claim 2, wherein the controller is further configured to determine whether a driver door has been opened and subsequently closed.

4. The system of claim 3, wherein the controller is further configured to determine, subsequent to the driver door opening and closing, whether a rear door of the vehicle has opened.

5. The system of claim 3, wherein the controller is further configured to determine whether a rear door of the vehicle has opened within a predefined time from the driver door closing.

6. The system of claim 5, wherein the controller is configured to transmit the presence information in response to the indication and in response to a rear door not opening within the predefined time from the driver door closing.

7. A vehicle occupant alert system comprising:
   a mobile device having a processor configured to
      receive, from a vehicle, presence data indicative of an object in a rear seat of a vehicle; and
      transmit, in response to the data, a command to a wearable device including instructions for a haptic alert at the wearable device.

8. The system of claim 7, wherein the wearable device is configured to come into contact with a user for realization of the haptic alert.

9. The system of claim 7, wherein the presence data further indicates that a rear door of the vehicle has not been opened for a predefined amount of time since a driver door of the vehicle has been closed.

10. The system of claim 7, wherein the presence data is received over a first communication link and the command is transmitted over a second communication link distinct from the first communication link.

11. The system of claim 10, wherein the second communication link is a communication link between the mobile device and the wearable device.

12. A system comprising:
    a controller configured to
       receive, from a door sensor, an indication of a closing of a driver door,
       receive, from a seat sensor, an indication of an object in a rear seat, and
       transmit, in response to the indication of the object and a rear door not opening within a predefined amount of time from the closing of the driver door, presence information indicating the object in the rear seat to a mobile device, the presence information to cause the mobile device to transmit a command to a wearable device including instructions for an alert at the wearable device.

13. The system of claim 12, wherein the controller is further configured to receive an indication of an engine key-off triggering the controller to monitor the vehicle doors.

14. The system of claim 12, wherein the alert is a haptic alert at the wearable device.

* * * * *